(12) United States Patent
Brady

(10) Patent No.: US 7,073,760 B2
(45) Date of Patent: Jul. 11, 2006

(54) SUPPORT STRUCTURE FOR SPA SPEAKERS

(76) Inventor: James P. Brady, 1601 E. Orangethorpe Avenue, Orange County, CA (US) 92831

( * ) Notice: Subject to any disclaimer, the term of this patent is extended or adjusted under 35 U.S.C. 154(b) by 45 days.

(21) Appl. No.: 10/789,283

(22) Filed: Jun. 9, 2004

(65) Prior Publication Data
US 2004/0222342 A1    Nov. 11, 2004

Related U.S. Application Data

(63) Continuation of application No. 10/366,291, filed on Feb. 14, 2003, now abandoned, which is a continuation of application No. 10/126,130, filed on Apr. 19, 2002, now Pat. No. 6,890,023, which is a continuation-in-part of application No. 09/912,815, filed on Jul. 24, 2001, now Pat. No. 6,608,909.

(51) Int. Cl.
*E04G 3/00*    (2006.01)
(52) U.S. Cl. .................................. 248/291.1; 381/361
(58) Field of Classification Search ............. 248/176.1, 248/176.3, 251, 276.1, 278.1, 282.1, 284.1, 248/288.11, 289.11, 291.1; 381/361, 362, 381/386, 387, 388, 389, 390; 211/26, 144, 211/170, 172, 206; 181/141; 455/350; 601/157; D12/223, 406; D14/224, 221, 204
See application file for complete search history.

(56) References Cited

U.S. PATENT DOCUMENTS

| | | | |
|---|---|---|---|
| 1,734,522 A | 11/1929 | Kauffman | 248/103 |
| 2,166,989 A | 7/1939 | Gleason | 248/251 |
| 2,409,152 A | 10/1946 | Rundell | 16/338 |
| 2,645,446 A | 7/1953 | Ulrich | 16/342 |
| 2,653,002 A | 9/1953 | Passman | 248/289.11 |
| 2,701,114 A | 2/1955 | Donaldson | 16/445 |
| 3,233,745 A | 2/1966 | Hershberger | 211/104 |
| 3,385,929 A | 5/1968 | Magyar et al. | 381/300 |
| 3,585,991 A | 6/1971 | Balamuth | 310/334 |
| 3,788,642 A | 1/1974 | Matras et al. | 248/291.1 |
| 3,976,162 A | 8/1976 | Cummings | 181/141 |
| 4,061,877 A | 12/1977 | Phillips | 381/301 |
| 4,063,704 A | 12/1977 | Rother | 211/70.8 |
| 4,075,438 A | 2/1978 | Kappel | 381/301 |
| 4,101,107 A | 7/1978 | Antoszewski | 248/218.4 |
| 4,113,218 A | 9/1978 | Linder | 248/124.1 |
| 4,392,627 A | 7/1983 | Van den Broek | 248/176.1 |

(Continued)

FOREIGN PATENT DOCUMENTS

FR    2 410 766    11/1977    ............. 248/291.1

(Continued)

*Primary Examiner*—Ramon O Ramirez
(74) *Attorney, Agent, or Firm*—Cislo & Thomas, LLP

(57) ABSTRACT

A speaker rack for use with spas including a first and second member with the second member comprising generally extending members. The first member is coupled to the generally extending members of the second member. This first member allows for support, helps an individual move the speaker rack into different positions easily, and acts as a place to hang towels, clothing, and the like. Multi-position detents attach to the second member and allow for the speaker rack to be placed in an extreme upward position, an extreme downward position, and positions in between. Speakers that can be swiveled and pivotally mounted attach to speaker attachment means on the generally extending members of the second member, and speaker wiring may run through an aperture in the second member and attach to an output device allowing for entertainment while in or around the spa.

8 Claims, 6 Drawing Sheets

U.S. PATENT DOCUMENTS

| | | | |
|---|---|---|---|
| 4,445,228 A | 4/1984 | Bruni | 381/302 |
| 4,475,226 A | 10/1984 | Greenberg | 362/370 |
| D281,317 S | 11/1985 | Whitaker | D14/224 |
| 4,575,882 A | 3/1986 | Diamond | 4/559 |
| 4,753,408 A | 6/1988 | Wailes | 108/145 |
| 4,880,196 A | 11/1989 | Eichenlaub | 248/165 |
| 4,964,181 A | 10/1990 | Alpert | 4/597 |
| 5,127,617 A | 7/1992 | Bergetz | 108/48 |
| 5,201,896 A | 4/1993 | Kruszewski | 248/278.1 |
| 5,282,251 A | 1/1994 | Peterson | 381/301 |
| D369,806 S | 5/1996 | Ichikawa | D14/172 |
| D376,093 S | 12/1996 | Whitaker et al. | D8/349 |
| D395,892 S | 7/1998 | Solomon | D14/224 |
| 5,802,194 A | 9/1998 | Yamagishi et al. | 181/144 |
| 5,889,875 A | 3/1999 | Caron et al. | 381/338 |
| 5,947,434 A | 9/1999 | Kosmoski | 248/221.11 |
| 6,015,132 A | 1/2000 | Belle | 248/205.3 |
| D434,028 S | 11/2000 | DeFazio | D14/224 |
| 6,157,729 A | 12/2000 | LeBlanc | 181/141 |
| D451,495 S | 12/2001 | McGurty | D14/214 |
| D451,880 S | 12/2001 | Adams et al. | D12/406 |
| 6,345,797 B1 | 2/2002 | Ming-Hsiao | 211/105.1 |

FOREIGN PATENT DOCUMENTS

| | | | |
|---|---|---|---|
| JP | 55-141838 | 6/1980 | 381/361 |

SUPPORT STRUCTURE FOR SPA SPEAKERS

This application is a continuation of U.S. application Ser. No. 10/366,291, filed Feb. 14, 2003 now abandoned, which is a continuation of U.S. application Ser. No. 10/126,130, filed Apr. 19, 2002, now U.S. Pat. No. 6,890,023, which is a continuation-in-part of U.S. application Ser. No. 09/912,815, filed Jul. 24, 2001, and issued as U.S. Pat. No. 6,608,909 on Aug. 19, 2003, the disclosure of which is incorporated herein in their entirety by reference.

BACKGROUND OF THE INVENTION

1. Field of the Invention

This invention relates generally to speaker assemblies and, more specifically, to speaker racks that are foldable for use with spas.

2. Description of the Related Art

Combining audio entertainment with whirlpool bathtubs or spas is known in the art. Also, the dangers involved in having electrical equipment near water are well known. For many individuals that have separate spas, who desire to have audio entertainment while relaxing in these spas, a solution lies in the transport of a portable stereo system. Problems arise with this scenario, such as the proximity of electrical equipment to an amount of water in which a user remains and proximity to an electrical source for such equipment. Also, for those who might use battery power for such electrical equipment, the length of time that power will last, as well as the increasing cost or inconvenience to consistently replace or recharge said battery power, can be a substantial issue. Yet another issue involved is the storing of the electrical equipment which will require some further transportation of this electrical equipment, possibly while the user is still damp from the spa water.

In existing embodiments of spa entertainment, holes are cut into the spa shell and the speakers and audio equipment are placed within. Problems arise with the manufacturer because there is a need to retool the mold in order to make room for the speakers and other audio equipment which in turn creates additional problems such as increased manufacturing costs. Shipping these spa shells also becomes a problem because of the odd shapes created in the spa shell itself. Also, retooling the mold creates inefficiencies for the spa manufacturers by destroying the consistency of the spa shell shape. Not only will buyers will be limited in the selection of these newly molded shells, but problems in the aftermarket will be created.

Mountable speaker systems and mounting brackets for speakers are well known in the art. Speaker assemblies are available that correspond to solving specific problems or have special features such as speaker devices for the hearing impaired and surround sound speaker systems. These speaker systems, however, do not allow for easy storage or have the ability to be used in conjunction with a variety of different spas.

Therefore, what is needed in the art is a speaker rack that eliminates all the inconveniences of special mold manufacturing, eliminates unnecessary additional costs for the spa manufacturer, is easily adjustable, allows for all of the audio equipment to be housed outside of the spa environment, has simple storage means, and can be used in conjunction with a variety of spas, regardless of size or shape.

SUMMARY OF THE INVENTION

The present invention includes a first transverse member and a second support member that further includes oppositely disposed first and second generally extending members. The first transverse member couples to and extends between the oppositely disposed generally extending members of the second support member, and one or more positioning members couple to the second support member allowing for securing the members into an extreme upward, an extreme downward, and positions in between. The one or more positioning members, which can be multi-position detents, either attach to the spa itself, to attachment means on the spa, or to an independent standing means. The oppositely disposed generally extending members have speaker attachment means allowing for speakers to be swivel and pivot mounted. The first transverse member allows for towels, clothing, or the like to be hung while using the spa, and both the first transverse member and second support member may allow for telescopic movement so that adjustments can be made to the spacing between the speakers allowing for use with different sized and shaped spas. The first transverse member, second support member, and oppositely disposed first and second generally extending members include apertures allowing speaker wire to run through and connect to an input or output device. The present invention may include a housing unit and a table element. The table element, which may include engagement means for easy maneuverability, connects to the first transverse member while the housing unit connects to the spa and can surround the second support member. The housing unit includes apertures allowing the speakers to rest inside while in the extreme downward position.

OBJECTS OF THE INVENTION

It is an object of the present invention to provide an easily adjustable and easily storable speaker rack for use with spas or the like.

It is a further object of the present invention to provide a location near the spa for the placement of beverages, hanging of towels and clothing, or the like.

It is a further object of the present invention to provide both an easily adjustable and easily storable speaker rack for use with spas and to provide a location near the spa for the placement of beverages, hanging of towels and clothing or the like.

These and other objects and advantages of the present invention will be apparent from a review of the following specification and accompanying drawings.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
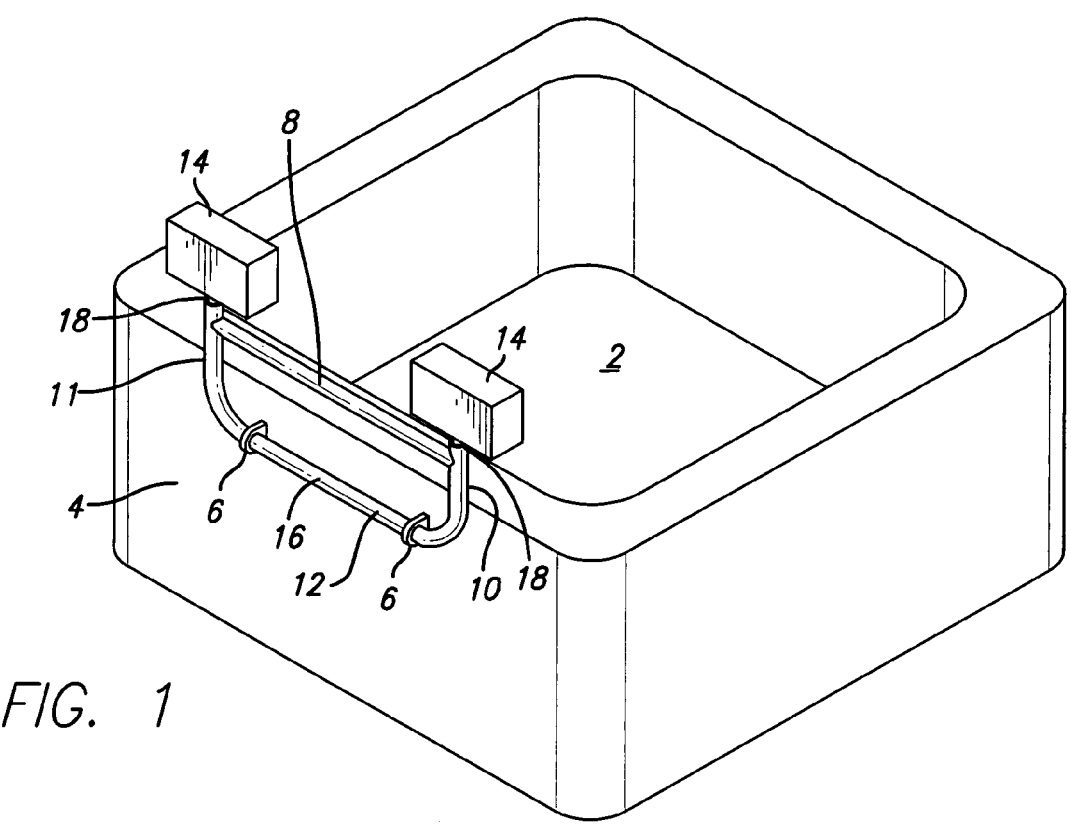
FIG. 1 is a rear perspective view of the present invention shown in its extreme upward position while attached to a spa.

FIG. 1 shows a spa 2 comprising the present invention in its extreme upward position or operational position. The present invention can attach to the any face 4 of the spa 2 by way of spa attachment means or one or more positioning members or multi-position detents 6 that can be securely attachable to the spa or to spa attachment means. The two multi-position detents 6 allow the present invention to be secured in up, down or any position in between. A transverse member 12 or assembly element, adaptable to a spa 2 for association thereto, having a diverging end 10 from its axis and a second opposite diverging end 11 can be movably held in either an upright or folded position. The diverging ends 10, 11 or oppositely and opposing first and second generally extending members, are adaptable for association with speakers. A support member 8 used for allowing a convenient location for hanging towels, clothing and the like, securely attaches to and extends between the diverging ends 10, 11 of the transverse member 12. In the present invention, the diverging ends 10, 11 curve in an upward direction, although this is not required. A user pulling on the support member 8 can easily adjust and secure the present invention into many different positions in between the extreme upward and downward position, by the two multi-position detents 6. The transverse member 12 pivotally couples to the multi-position detents 6, which can attach to the spa 2, to attachment means on the spa 2 or to an independent standing means (not shown) not attached to the spa 2.

The diverging ends 10, 11 of the transverse member 12 include speaker attachment means 18. The speaker attachment means 18 on the diverging ends 10, 11 may have swivel and pivot capabilities. The first and second speakers 14 shown in FIG. 1 are rectangular, however, any size or shaped speakers 14 may be used in conjunction with the present invention. These first and second speakers 14 can couple to the speaker attachment means 18 such that the speakers 14 have the ability to swivel and pivot. Inside the transverse member 12 there exists space allowing speaker wiring (not shown) to pass through and the transverse member 12 may contain an aperture 16 allowing speaker wiring to exit the transverse member 12 and connect to input or output devices (not shown). Although not necessary, it is preferable to run speaker wiring in a zigzag pattern to avoid any pulling on the first and second speakers 14 when the present invention is moved into different positions.

The support member 8 and transverse member 12 may have the ability to extend. In this instance, the support member 8 and transverse member 12 can telescopically extend, thereby allowing the distance between the first and second speakers 14 to be adjustable. In this embodiment, the support member 8 and transverse member 12 may comprise metal tubing, aluminum tubing, PVC tubing, or various other materials with similar properties may be used.

Figure 2:
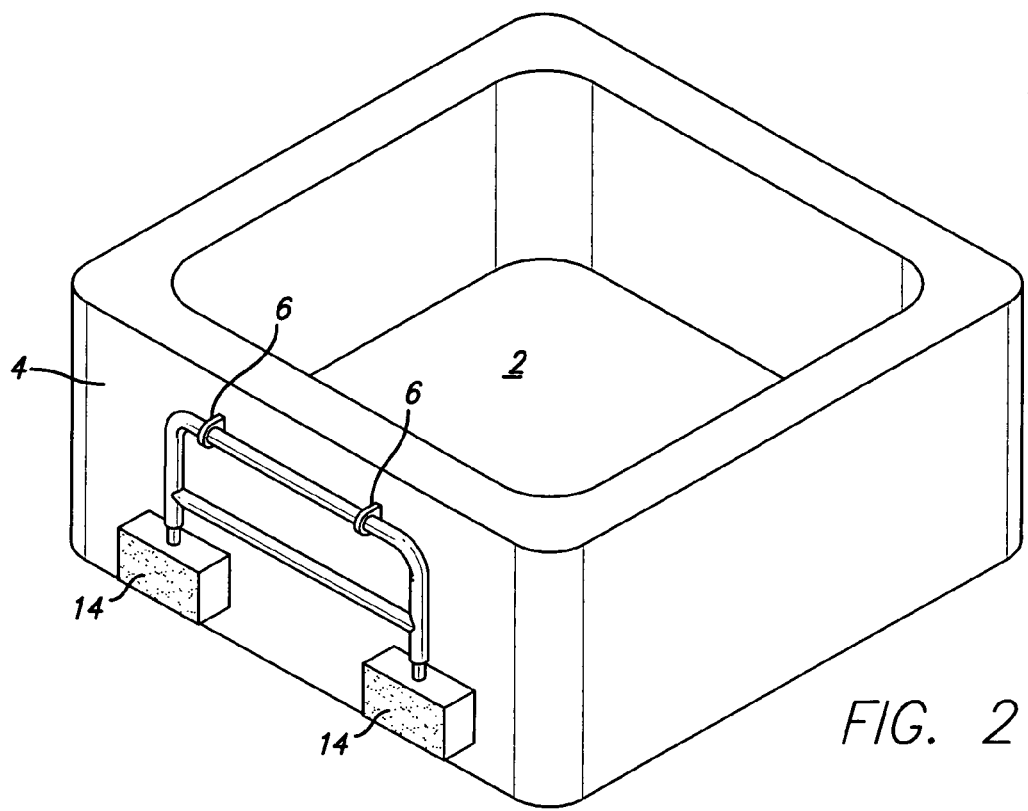
FIG. 2 is a rear perspective view of the present invention shown in its extreme downward position while attached to a spa.

FIG. 2 shows the present invention in the extreme downward position or retracted position. Besides the extreme upward and extreme downward position, the multi-position detents 6 can also allow the present invention to be positioned into many secure positions in between. When the present invention is in the extreme downward position, the first and second speakers 14 are allowed to project in a generally opposite direction from its operational position, allowing for audio entertainment to be heard outside of the spa 2 such as when a user is not located in the spa 2 but in the surrounding area.

Figure 3:
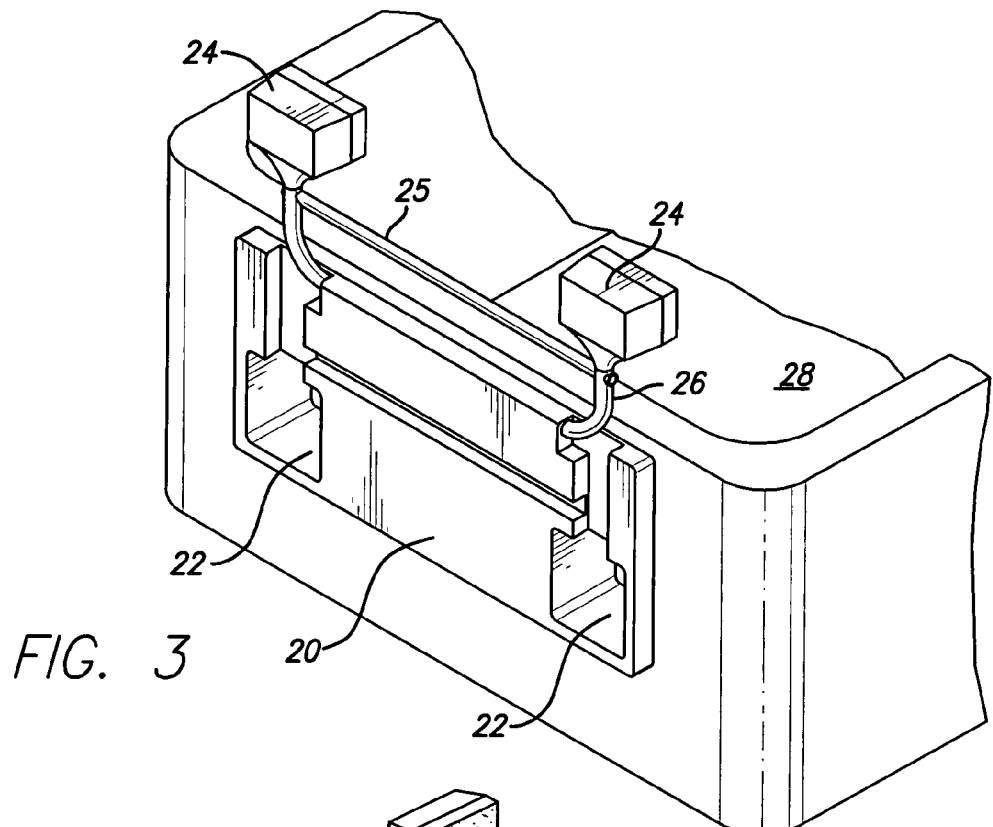
FIG. 3 is a rear perspective view of another embodiment of the present invention shown in its extreme upward position while attached to a spa.

FIG. 3 represents another embodiment of the present invention in the extreme upward position. In this embodiment, a housing unit 20 having apertures 22 couples to the spa 28 and surrounds the transverse member (not shown) and multi-position detents (not shown) allowing the first and second speakers 24 and support member 25 to fit inside the apertures 22 of the housing unit 20 when in the extreme downward position. In the extreme upward position, the first and second speakers 24 face in a direction toward the inside of the spa 28 but can be swivel and pivot mounted on the oppositely opposing first and second generally extending members 26 allowing for the first and second speakers 14 to be in many positions in relation to the inside of the spa 28. When in the extreme downward position, the first and second speakers 24 rest inside the corresponding apertures 22 and can face outward allowing for audio entertainment in the area surrounding the spa 28. Also, in the extreme upward position, the support member 25 can be used as a rack for towels, clothing or the like. Other apertures (not shown) can exist in the housing unit 20 to provide space for a radio, receiver and/or inverter, keeping the audio system outside of the spa environment. The housing unit 20 can be comprised of a molded plastic, foam, or other similar materials.

Figure 4:
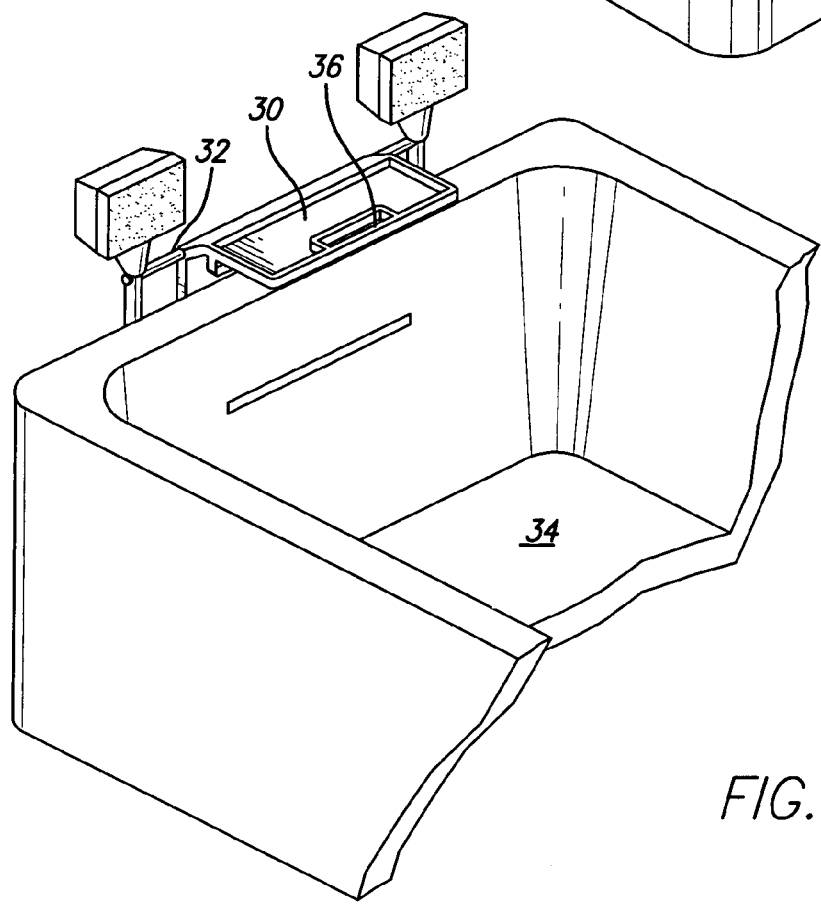
FIG. 4 is a front perspective view of another embodiment of the present invention shown in its extreme upward position while attached to a spa
Figure 5:
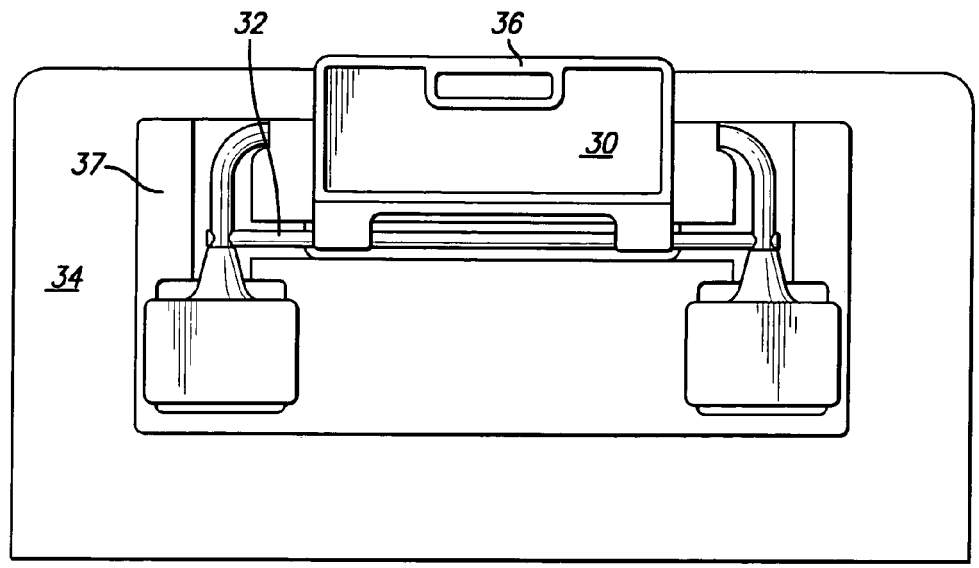
FIG. 5 is a rear view of the embodiment of the present invention as shown in FIG. 4 shown in its extreme downward position while attached to a spa.

In FIGS. 4 and 5 yet another embodiment of the present invention is shown. FIG. 4 shows the embodiment in the extreme upward position and FIG. 5 in the extreme downward position. A table element 30 couples to the support member 32 and in an extreme upward position, drinks and the like can be placed on the table element 30 while the individuals are inside or outside of the spa 34. The table element 30 may contain an engagement member 36 allowing a user a simpler method to move the present invention into different positions. Also, the table element 30 may be securely attached to the support member 32 or may have swiveling capabilities allowing the table element 30 to be moved from the inside to the outside of the spa 34 while in the extreme upward position. In the downward position, the table element 30 folds neatly against the housing unit 37.

Figure 6:
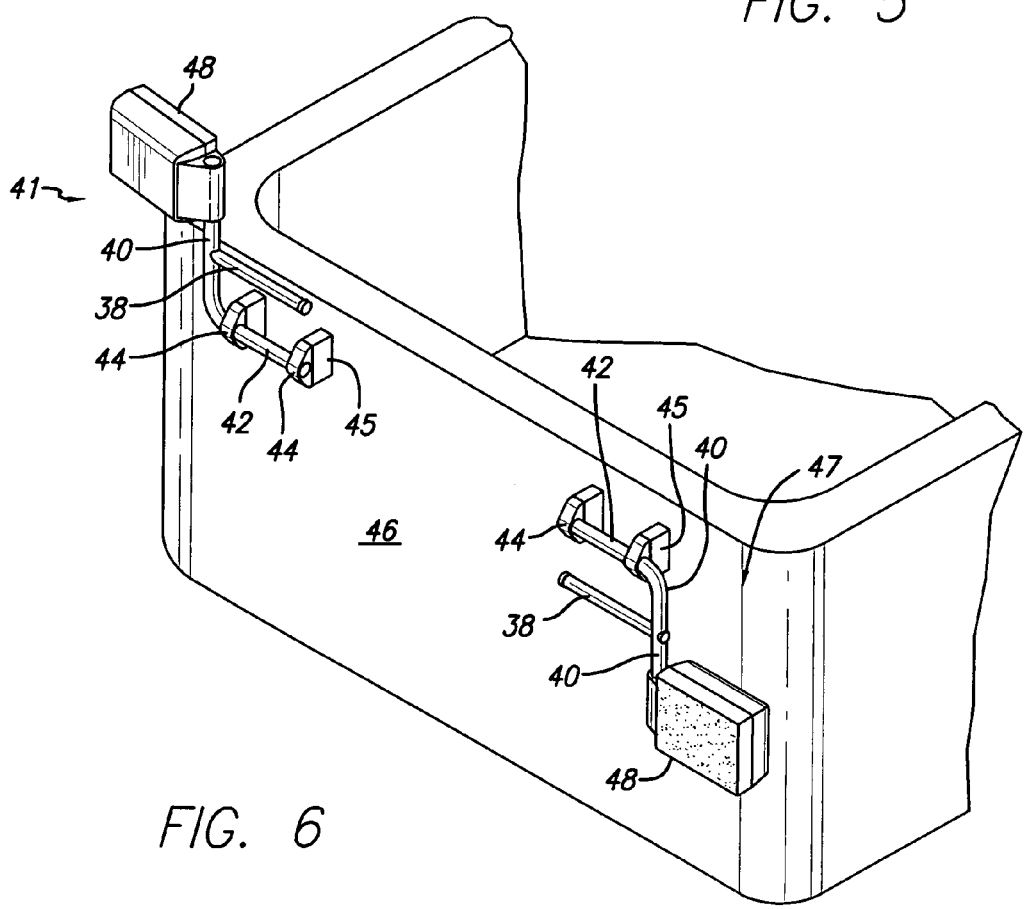
FIG. 6 is a rear perspective view of yet another embodiment of the present invention.

FIG. 6 represents yet another embodiment of the present invention. In this embodiment, a support structure 41 having a base 42 and at least one extending portion or a generally extending member 40 having an end adaptable to receive a speaker 48. A support member 38 couples to the generally extending member 40 of the support structure 41. The base 42 can be pivotally coupled to one or more multi-position detents 44 which can be coupled to the spa 46 itself, to spa attachment means 45, or to an independent standing means (not shown). The support member 38 can be used as a towel rack or the like as well as a handle for a user to position the present invention in the extreme upward, extreme downward or positions in between. This embodiment can allow for a plurality of these embodiments coupled to the spa 46, allowing one to be in an extreme upward position 43 or erected position for best audio sound to a user in the spa 46, while another is in the extreme downward position 47 or folded position for best audio sound for a user outside the spa 46. The base 42 can be mounted as shown in FIG. 6 but can also be mounted such that the base 42 and generally extending member 40 form a reverse "L" position so that the speaker 48 rests on the other side of the multi-position detents 44. The present embodiment is preferable when there are some guests using the spa 46 as well as other guests not using the spa, but located in the surrounding area.

Figure 7:
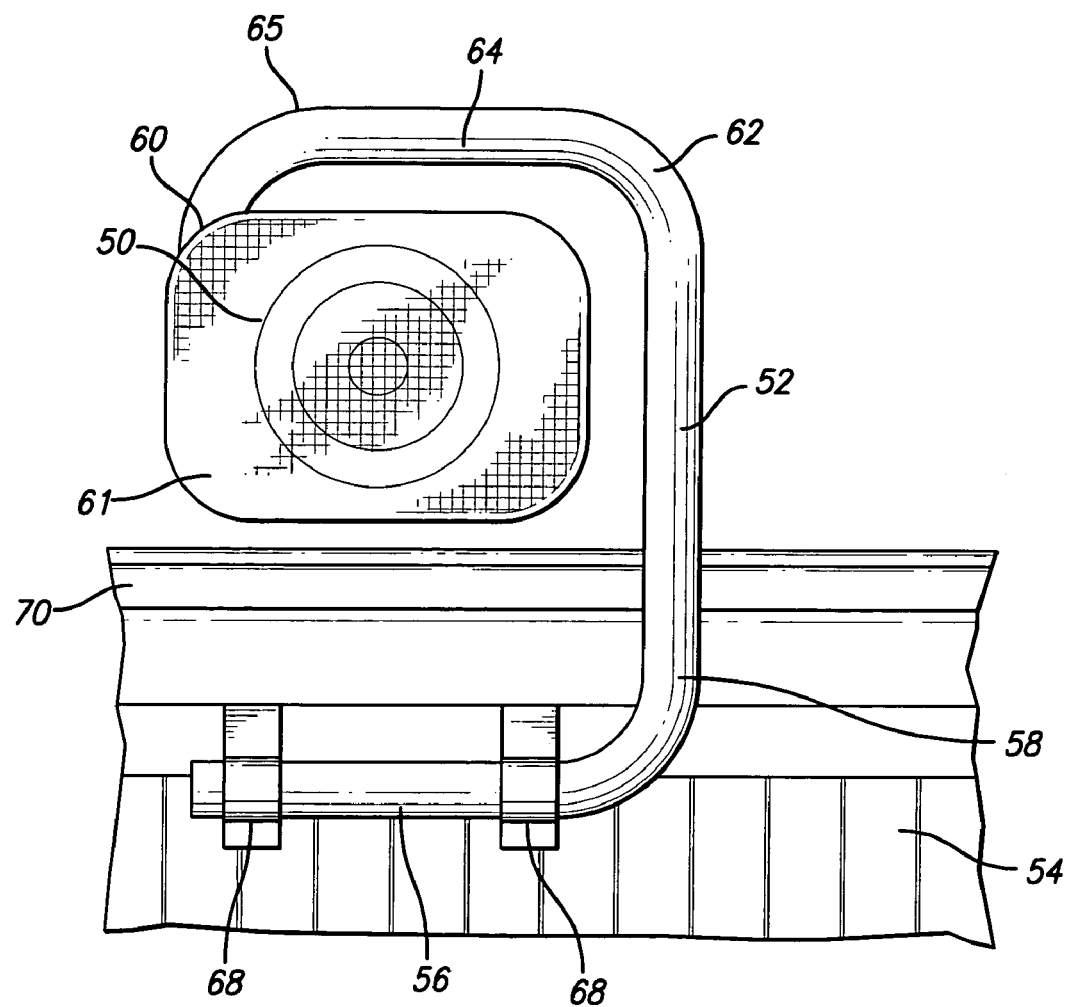
FIG. 7 is a rear perspective view of yet another embodiment of the present invention, shown in an extreme upward position.
Figure 8:
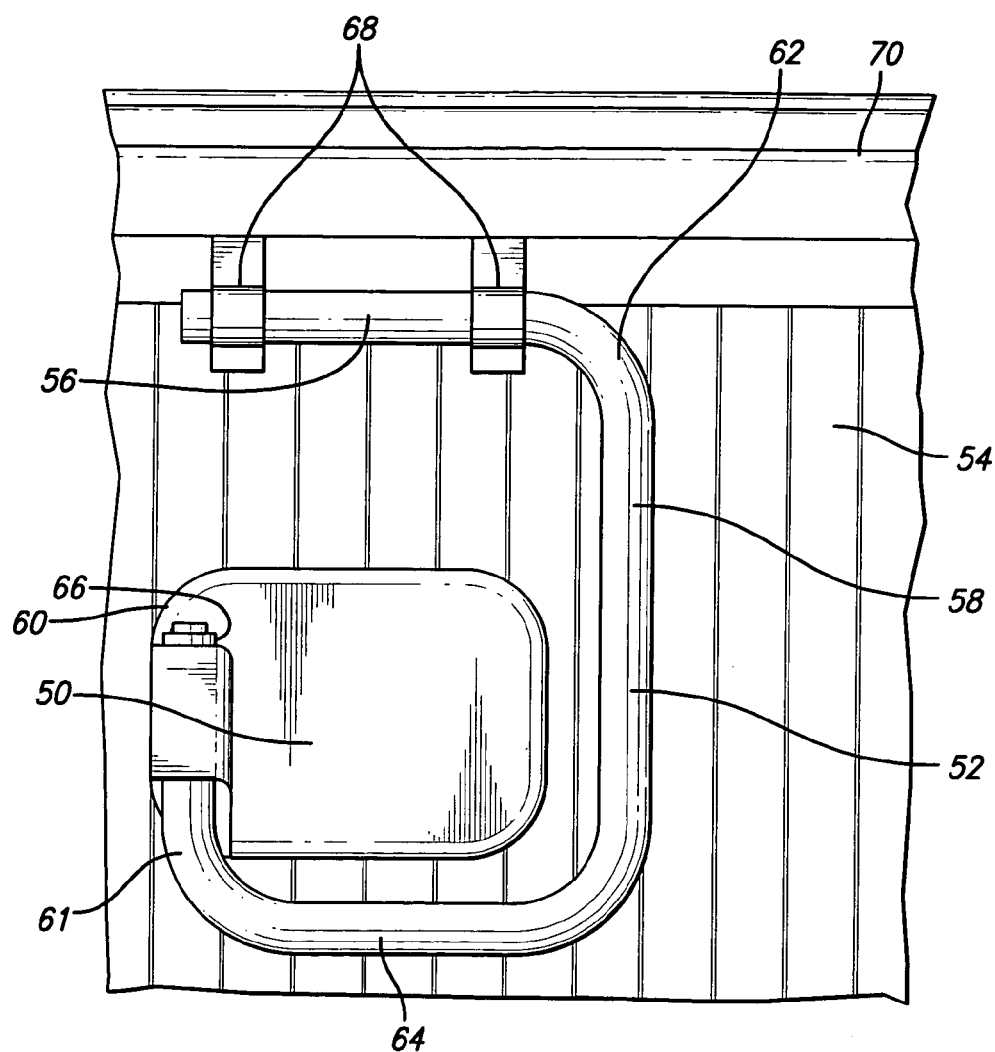
FIG. 8 is a view similar to FIG. 7 shown in an extreme downward position.
Figure 9:
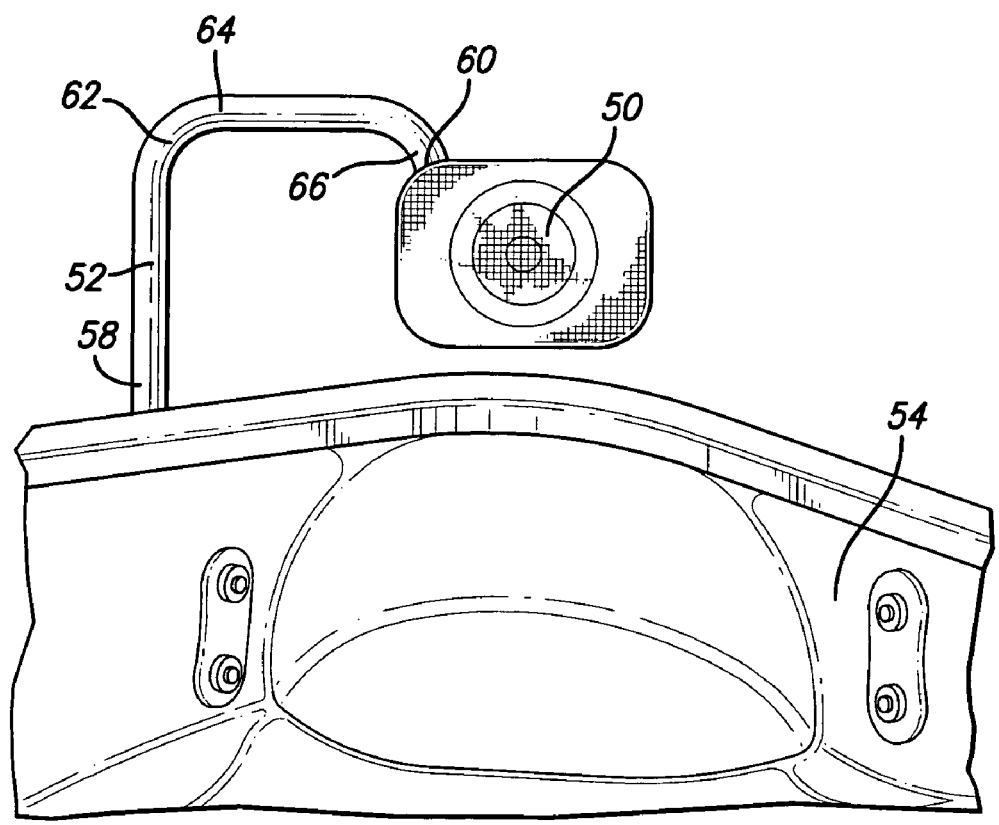
FIG. 9 is a front perspective view of the embodiment of FIG. 7.

FIGS. 7–9 illustrate another embodiment of the present invention wherein a speaker 50 is capable of swiveling or a 360 degree or less rotational movement on a support structure 52, when the speaker is in an upward position as shown in FIGS. 7 and 9. Speaker 50 can be also rotated to face towards the inside or outside of a spa 54, as shown in FIGS. 9 and 7, respectively, or any other direction as desired by the user. The support structure 52 has a base 56 similar to base 42 of FIG. 6 and an extending member 58. The extending member 58 has a first portion 62 extending upwards from the base 56, a second portion 64 extending sideways from the first portion 62, and a third portion 66 extending downwards from the second portion 64, when the speaker is in its upright position. The speaker includes a hollow portion extending from a top side 60 to a bottom side 61 of its mounting, through which the third portion 66 of the extending member 58 is inserted. Thus, the third portion 66 forms a pole on which speaker 50 rotationally hangs. Particularly, speaker 50 is capable of a 360-degree or less rotational movement relative to pole or third portion 66. Additionally, while the second portion 64 is illustrated as extending towards the left-hand side (in FIGS. 7 and 8) it may, of course, extend to the right-hand side as well. Other methods of providing a speaker capable of rotational movement (which may be less then 360 degrees) on support structure 52 will be apparent to one skilled in the art.

The base 56 can be pivotally coupled to the spa 54 via one or more multi-position detents 68 which are shown in FIGS. 7–8 as directly coupled beneath the rim 70 of the spa 54. Detents 68 can alternatively be directly coupled to the body of the spa, to an attachment on the spa, or to an independent standing means. Thus, the speaker 50 can be positioned in the extreme upward position as shown in FIGS. 7 and 9, in the extreme downward position as shown in FIG. 8, or positions in between. Many methods of coupling base 56 to spa 54 will be apparent to one skilled in the art. Additionally, base 56 and/or second portion 64 of extending member 58 could be used as towel racks or the like.

While the present invention has been described with regards to particular embodiments, it is recognized that additional variations of the present invention may be devised without departing from the inventive concept.

Thus, it is intended that the invention cover all embodiments and variations thereof as long as such embodiments and variations come within the scope of the appended claims and their equivalents.

What is claimed is:

1. A support structure for a spa speaker, comprising:
   a first elongated member;
   a second elongated member coupled to one end of said first elongated member, said coupled second elongated member being substantially perpendicular to said first elongated member;
   a speaker pivotally coupled to another end of said first elongated member;
   a base unit; and
   a third elongated member coupled to said second elongated member and adapted to rotate relative to said base unit, wherein said coupled third elongated member is substantially parallel to said first elongated member.

2. A support structure for spa speakers, comprising:
   a base unit;
   a first elongated member rotatably coupled to said base unit;
   a second elongated member coupled at one end to said first elongated member, said coupled second elongated member being substantially perpendicular to said first elongated member;
   a first speaker pivotally coupled to another end of said second elongated member;
   a third elongated member coupled at one end to said first elongated member substantially opposite said second elongated member, said coupled third elongated member being substantially perpendicular to said first elongated member;
   a second speaker pivotally coupled to another end of said third elongated member; and
   a housing unit surrounding said base unit, wherein said housing unit comprises a plurality of apertures corresponding to said first elongated member, said second elongated member, said third elongated member, and said first and second speakers.

3. A support structure for spa speakers, comprising:
   a base unit;
   a substantially U-shaped member comprising a first portion, a second portion, and a third portion, wherein said first portion is coupled to a first end of said second portion and said third portion is coupled to a second end of said second portion, said second portion being pivotally coupled to said base unit;
   a first speaker rotatably coupled to a first end of said first portion;
   a second speaker rotatably coupled to a first end of said third portion, said first and second speakers being rotatable about a longitudinal axis of said pivotally coupled second portion; and
   a support member spanning between said first and third portions of said substantially U-shaped member.

4. The support structure of claim 3, further comprising a table element coupled to said support member.

5. A support structure for spa speakers, comprising:
   a base unit;
   a substantially L-shaped member pivotally coupled at one end to said base unit;
   at least one speaker coupled to another end of said substantially L-shaped member, said at least one speaker being rotatable about a longitudinal axis of said pivotally coupled end of said substantially L-shaped member between a first position in which said at least one speaker faces toward the spa interior and a second position in which said at least one speaker faces away from the spa interior.

6. The support structure of claim 5, further comprising a support member coupled to said substantially L-shaped member between said at least one speaker and said pivotally coupled end thereof.

7. The support structure of claim 6, wherein said support member is substantially parallel to said pivotally coupled end of said substantially L-shaped member, said substantially parallel support member being adapted for use as a towel rack.

8. The support structure of claim 7, wherein said substantially parallel support member is adapted for use as a handle to rotate said at least one speaker between said first and second positions.

* * * * *